United States Patent
Premus et al.

(10) Patent No.: US 9,869,752 B1
(45) Date of Patent: Jan. 16, 2018

(54) SYSTEM AND METHOD FOR AUTONOMOUS JOINT DETECTION-CLASSIFICATION AND TRACKING OF ACOUSTIC SIGNALS OF INTEREST

(71) Applicant: OCEAN ACOUSTICAL SERVICES AND INSTRUMENTATION SYSTEMS, INC., Lexington, MA (US)

(72) Inventors: Vincent Premus, Pepperell, MA (US); Philip Abbot, Lexington, MA (US); Charles Gedney, Sudbury, MA (US); Richard Campbell, Seattle, WA (US); Mark Helfrick, North Billerica, MA (US)

(73) Assignee: OCEAN ACOUSTICAL SERVICES AND INSTRUMENTATION SYSTEMS, INC., Lexington, MA (US)

( * ) Notice: Subject to any disclaimer, the term of this patent is extended or adjusted under 35 U.S.C. 154(b) by 0 days.

(21) Appl. No.: 15/495,536

(22) Filed: Apr. 24, 2017

Related U.S. Application Data

(60) Provisional application No. 62/327,337, filed on Apr. 25, 2016.

(51) Int. Cl.
  *G01S 5/22* (2006.01)
  *B63B 21/56* (2006.01)
  *B63G 8/00* (2006.01)

(52) U.S. Cl.
  CPC ............... *G01S 5/22* (2013.01); *B63B 21/56* (2013.01); *B63B 2211/02* (2013.01); *B63G 2008/002* (2013.01)

(58) Field of Classification Search
  CPC ............... B63B 21/56; B63B 2211/02; B63G 2008/002
  See application file for complete search history.

(56) References Cited

U.S. PATENT DOCUMENTS

| 5,068,385 A | 11/1991 | Jiang et al. |
| 6,058,075 A | 5/2000 | Bourdelais |
| 6,501,705 B1 | 12/2002 | Molini et al. |

(Continued)

FOREIGN PATENT DOCUMENTS

CN 104730528 A 1/2015

OTHER PUBLICATIONS

CURRENTS The Navy's Energy & Environmental Magazine, Spring 2015, 68 pages.*

(Continued)

*Primary Examiner* — Daniel Pihulic
(74) *Attorney, Agent, or Firm* — McDermott Will & Emery LLP

(57) ABSTRACT

Systems and methods are disclosed for autonomous joint detection-classification of acoustic sources of interest. Localization and tracking from unmanned marine vehicles are also described. Based on receiving acoustic signals originating above or below the surface, a processor can process the acoustic signals to determine the target of interest associated with the acoustic signal. The methods and systems autonomously and jointly detect and classify a target of interest. A target track can be generated corresponding to the locations of the detected target of interest. A classifier can be used representing spectral characteristics of a target of interest.

20 Claims, 7 Drawing Sheets

(56) References Cited

U.S. PATENT DOCUMENTS

| | | |
|---|---|---|
| 6,914,854 B1 | 7/2005 | Heberley et al. |
| 6,980,486 B1 | 12/2005 | Kneipfer et al. |
| 7,106,656 B2 | 9/2006 | Lerro et al. |
| 7,319,640 B1 | 1/2008 | Donald et al. |
| 7,760,587 B2 | 7/2010 | Abbot et al. |
| 8,107,320 B2 | 1/2012 | Novick et al. |
| 8,694,306 B1 | 4/2014 | Short et al. |
| 2003/0227823 A1 | 12/2003 | Carter et al. |
| 2010/0046326 A1* | 2/2010 | Lovik .................... G01S 7/539 367/87 |
| 2010/0315904 A1 | 12/2010 | Brinkmann et al. |

OTHER PUBLICATIONS

Bono, Michael, et al. "Subband Energy Detection in Passive Array Processing" Texas University at Austin Applied Research Labs, pp. 25-30, 2000.

Kneipfer, Ronald R. "Sonar Beamforming—An Overview of Its History and Status" Naval Undersea Warfare Center Detachment, Technical Report 10,003, 27 pages, Apr. 7, 1992.

Wenz, Gordon M., "Acoustic Ambient Noise in the Ocean: Spectra and Sources" The Journal of the Acoustical Society of America, vol. 34, No. 12, pp. 1936-1956, Dec. 1962.

Verfuβ, U.K., et al. "BIAS Standards for noise measurements. Background information, Guidelines and Quality Assurance" BIAS (Baltic Sea Information of the Acoustic Soundscape), 71 pages, 2014.

Zarnich, Robert E. "A Fresh Look at Broadband Passive Sonar Processing" In Proceedings of the 1999 Adaptive Sensor Array Processing Workshop (ASAP '99), MIT Lincoln Laboratory, Lexington, MA, Mar. 1999.

\* cited by examiner

SYSTEM AND METHOD FOR AUTONOMOUS JOINT DETECTION-CLASSIFICATION AND TRACKING OF ACOUSTIC SIGNALS OF INTEREST

CROSS-REFERENCE TO RELATED APPLICATIONS

The present application claims the benefit of priority under 35 U.S.C. §119 from U.S. Provisional Patent Application Ser. No. 62/327,337 entitled "Autonomous, Embedded, Real-Time Digital Signal Processing Method and Apparatus for Passive Acoustic Detection, Classification, Localization, and Tracking from Unmanned Undersea Vehicles (UUV) and Unmanned Surface Vehicles (USV)", filed on Apr. 25, 2016, the disclosure of which is hereby incorporated by reference in its entirety for all purposes.

BACKGROUND

In underwater environments, acoustic signals are generated by a variety of acoustic sources, with examples including, but not limited to, marine mammals, fish, meteorological or geological phenomenon, as well as marine vehicles, such as military, recreational or commercial vehicles operating at or below the surface. Acoustic signals corresponding to a particular source can be particularly difficult to detect due to presence of noise in the marine environment. For example, acoustic data measured/recorded by a hydrophone can include significant noise (N) in addition to signals (S) associated with an acoustic source of interest, such that the data is actually represent a sum of the signal(s) and the noise (S+N). The noise components can be very significant, potentially masking many signals of interest. This problem of noise is often exacerbated by the typically anisotropic and temporally variable character of noise in undersea environments. See, e.g., Wenz, G., "Ambient Noise in the Ocean: Spectra and Sources," J. Acoustic Soc. Am., Vol. 34, no. 12 (December 1962), the entire content of which is incorporated herein by reference.

Equipment for analyzing or characterizing acoustic signals in marine environments, e.g., in sub-surface conditions, have typically either been tethered or linked via underwater acoustic communications (ACOMMS) to an above-surface antenna, or have been included in under-water vessels that have large computing resources and power reserves, e.g., submarines. Generally, acoustic signal and target data in unmanned marine environments must be recorded, stored, transmitted and post-processed using a variety of complex disparate system components, such as sensors, transceivers, and computing devices before accurately detecting, classifying and tracking targets of interest. The ability to autonomously record, process and transmit marine acoustic signals associated with a target of interest in real-time has been limited by the processing power, battery life, available memory, communication capabilities, and/or the signal processing algorithms associated with a given vehicle platform or system implementation.

SUMMARY

Aspects and implementations of the subject technology of the present disclosure provide methods and systems for autonomously performing simultaneous (or, "joint") detection and classification of acoustic targets of interest; in some embodiments, acoustic targets of interest can be tracked after the joint detection-classification occurs. The joint detection and classification ("detection-classification") is performed on acoustic data received from or provided by one or more acoustic sensors, e.g., hydrophones. The collected acoustic data represent acoustic signals (and noise) received from targets, objects and sources of interest present in a marine environment. Autonomously processing the acoustic signals in real-time from a marine vehicle platform is accomplished utilizing a joint detection-classification method according to an implementation of one aspect of the present disclosure.

In one aspect, the present disclosure relates to a method for autonomous joint detection-classification, and tracking of targets of interest. In one example, the method includes receiving acoustic signals from two or more hydrophone sensors. The acoustic signals are characterized by time-series data. The method includes detecting a target of interest from the received acoustic signals. The method further includes transforming the received acoustic signals from the time domain to the frequency domain. The method also includes generating a relative-bearing beam response in one or more steering directions. The method includes estimating the median background noise level of the relative-bearing beam response and normalizing the spectral response by the estimated background noise level. The method further includes performing a joint detection-classification operation. The joint detection-classification operation is a selective frequency integration of the normalized spectral responses associated with each relative-bearing beam response. The frequency integration is informed by the detailed physics of the underlying classifier for the target of interest to satisfy a spatial and spectral hypothesis of the classifier. The method includes computing a detection surface in bearing and time based on the frequency integration of the joint detection-classification operation. The method also includes determining a decision surface in bearing and time by calculating a constant-false-alarm-rate (CFAR) detection threshold from the estimated noise background level and applying the constant-false-alarm-rate detection threshold to the detection surface. The method further includes generating a target track corresponding to the decision surface. The method includes associating decision surface threshold exceedances to produce a relative-bearing track as a function of bearing and time. The method also includes calculating a true bearing track corresponding to each of the relative-bearing tracks by reconciling the relative-bearing tracks with an estimate of hydrophone sensor array orientation. The method further includes transforming the acoustic signals from the frequency domain to the time domain using the relative-bearing track to generate the target track. The method also includes generating a summary report of spectral data associated with each target track and outputting a compressed data report identifying the characteristics of the generated target track included in the generated summary report.

In a further aspect, the present disclosure relates to a system for autonomous joint detection-classification, and tracking of targets of interest. In one example, the system includes a hydrophone sensor array configured to receive and transmit acoustic signals originating above or below the surface. The system further includes, a marine vehicle platform including a memory module, a communications module, a global positioning system receiver and one or more embedded processors configured to autonomously receive acoustic signals from hydrophone sensors. The acoustic signals are characterized by time-series data. The embedded processors are further configured to detect a target of interest by transforming the acoustic signals from the time domain to the frequency domain and generating a relative-bearing beam response for each of the transformed signals. The embedded processors are also configured to estimate the median background noise level of the relative-bearing beam response and normalize the spectral response of the relative-bearing beam response by the estimated background noise level. The embedded processors are further configured to perform a joint detection-classification operation. The joint detection-classification operation is a selective frequency integration of the normalized spectral responses associated with each relative-bearing beam response. The frequency integration is constrained by the detailed physics of the underlying classifier for the target of interest to satisfy a spatial and spectral target hypothesis of the classifier. The embedded processors are configured to compute a detection surface in bearing and time based on the frequency integration of the joint detection-classification operation. The embedded processors are also configured to determine a decision surface in bearing and time by calculating a constant-false-alarm-rate (CFAR) detection threshold from the estimated background noise level and applying the constant-false-alarm-rate detection threshold to the detection surface. The embedded processors are configured to generate a target track corresponding to the decision surface by associating decision surface threshold exceedances to produce a relative-baring track as a function of time. The embedded processors are also configured to calculate a true bearing track corresponding to each of the relative-bearing tracks with an estimate of hydrophone sensor array orientation. The embedded processors are further configured to transform the acoustic signals from the frequency domain to the time domain using the relative-bearing track and generate a summary report of spectral data associated with each target track. The embedded processors are also configured to output a compressed data report identifying the characteristics of the generated target track included in the generated summary report.

In another aspect, the present disclosure relates to a system for autonomous joint detection-classification, and tracking of targets of interest. In one example, the system includes a memory and a processor having access to the memory. The processor is configured to receive acoustic signals from acoustic sensors. The acoustic signals are characterized by time-series data. The processor is further configured to detect a target of interest by transforming the acoustic signals from the time domain to the frequency domain and generating a relative-bearing beam response for each of the transformed signals. The processor is also configured to estimate the median background noise level of the relative-bearing beam response and normalize the spectral response of the relative-bearing beam response by the estimated background noise level. The processor is further configured to perform a joint detection-classification operation. The joint detection-classification operation is a selective frequency integration of the normalized spectral responses associated with each relative-bearing beam response. The frequency integration is constrained by an underlying classifier for the target of interest to satisfy a spatial and spectral target hypothesis of the classifier. The processor is configured to compute a detection surface in bearing and time based on the frequency integration of the joint detection-classification operation. The processor is also configured to determine a decision surface in bearing and time by calculating a constant-false-alarm-rate (CFAR) detection threshold from the estimated background noise level and applying the constant-false-alarm-rate detection threshold to the detection surface. The processor is configured to generate a target track corresponding to the decision surface indicating the track of the target of interest.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The above and related features, and advantages of the present disclosure will be more fully understood by reference to the following detailed description, when taken in conjunction with the following figures, wherein.

Like reference numbers and designations in the various drawings indicate like elements.

Figure 1:
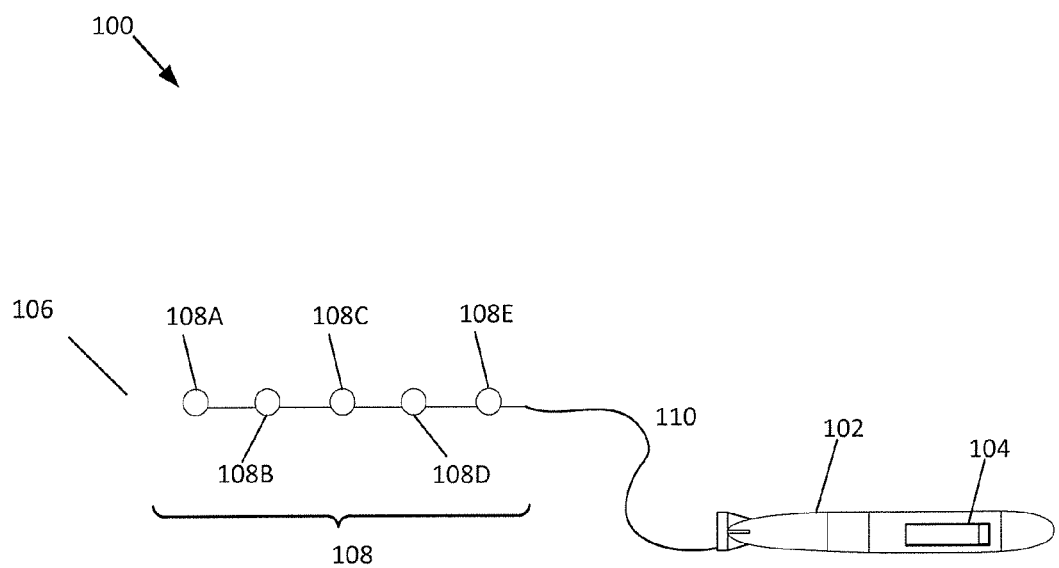
FIG. 1 is a diagram of an exemplary system configuration for autonomous joint detection-classification, and tracking of targets of interest using a marine vehicle platform.

In one or more implementations, not all of the depicted components in each figure are required, and one or more implementations can include additional components not shown in a figure. Variations in the arrangement and type of the components can be made without departing from the scope of the subject disclosure. Additional components, different components, or fewer components can be utilized within the scope of the subject disclosure.

DETAILED DESCRIPTION

The detailed description set forth below is intended as a description of various implementations and is not intended to represent the only implementations in which the subject technology can be practiced. As those skilled in the art would realize, the described implementations can be modified in various different ways, all without departing from the scope of the present disclosure. Accordingly, the drawings and description are to be regarded as illustrative in nature and not restrictive.

Examples of systems and methods are described herein for autonomous joint detection-classification and tracking acoustic sources of interest in real-time from collected acoustic data. Exemplary embodiments are shown and described in the context of marine environments where acoustic sensor arrays (including two or more hydrophones) are deployed using a marine vehicle as a host platform. As described with particular focus herein, acoustic signal data can include data corresponding to the propagation of sound through water or other liquids. In other embodiments of the present disclosure, however, acoustic signal data can include data corresponding to the propagation of sound through air or another medium.

According to embodiments of the present disclosure, one or more acoustic sources (or targets) of interest are detected and classified jointly and then tracked. The joint detection-classification and tracking can be performed autonomously, without requiring any human intervention. These processes (functionality) can be realized and accomplished with low-power and computationally efficient processing. Acoustic signals can be processed to reduce or reject the noise that exists in a received signal in order to facilitate joint detection-classification, and tracking of the desired signal sources or objects associated with signal of interest. For example, cod fish generate specific noises or acoustic signals during mating that can be detected and classified to assist scientists tracking the location or migration patterns of cod fish stocks in particular marine areas. In this example, scientists can use hydrophones to autonomously acquire sound data relating to cod fish migratory patterns from undersea platforms and process the sound data to distinguish the sounds generated by mating cod fish from other acoustic sounds or noise present in the marine environment (such as noise or sounds associated with other marine species which are not being studied by scientists). A hydrophone is a microphone designed to record sound, or acoustic signals, underwater. The acoustic signals generated by targets of interest and other noise sources in marine environments can be received by a hydrophone or hydrophone sensor and digitized for transmission to the marine vehicle platform for further processing. A marine vehicle platform can be included in the system and can contain embedded processors configured to receive and process acoustic data received from the hydrophone sensor. The embedded processors can include generally available computing components, such as commercial-off-the-shelf hardware and software components configured for acoustic signal processing in marine environments. The embedded processors can be configured with signal processing algorithms and logic to perform autonomous joint detection-classification, and tracking of acoustic signals corresponding to particular targets of interest in a real-time manner.

In some implementations of the present disclosure, the joint detection-classification functionality or the components executing the joint detection-classification functionality operate jointly or in parallel to increase sensitivity to weak signals. For example, utilizing a joint detection-classification method makes use of all information embedded in the measured acoustic signal thereby avoiding any assumptions of spectral feature independence that can may be invoked in implementations where detection, classification, and tracking are performed sequentially. A consequence of sequential detection, classification, and tracking implementations is that the detection functionality discards information related to the correlation or interdependence of noise spectrum features radiated by the target of interest. While sequential implementations may reduce computational costs, key performance measures such as passive sonar recognition differential may be limited, thus degrading overall system performance.

The embedded processors configured on the marine vehicle platform can perform autonomous joint detection-classification, and tracking of a target of interest. The target of interest can generate an acoustic signal that is received by a hydrophone sensor configured in an array of multiple hydrophone sensors towed behind or mounted on the marine vehicle platform. The embedded processors on the marine vehicle platform are configured to receive the acoustic signal and apply a series of signal processing techniques to jointly or simultaneously detect and classify the target of interest generating the acoustic signal as well as track the location of the target of interest. In one implementation, a decision surface can be identified for the target of interest producing the acoustic signal. Once the acoustic signal associated with the target of interest has been jointly detected and classified, the embedded processors configured on the marine vehicle platform can track the location of the target of interest. A target track identifying the exact relative or time bearing to the target of interest can be generated by associating detection surface threshold exceedances, or detection events with similar spatial and spectral characteristics to produce a relative-bearing track for the target of interest that has been jointly detected and classified. The accuracy of the relative-bearing track can be improved by reconciling the relative-bearing track with an estimate of the orientation or positioning of the hydrophone sensors. The embedded processors can be further configured to generate a report summarizing the spectral data associated with each target track. The embedded processors can further be configured to output or transmit the report and data describing the targets of interest in formats that are suitable for exfiltration in bandwidth limited operating environments or communication channels.

In some implementations, the hydrophone sensors can vary in type, arrangement or orientation. For example, a plurality of hydrophone sensors can be configured in an array and can transmit acoustic signal data to the marine vehicle platform on a telemetry cable. In other implementations, a hydrophone sensor array can be mounted to the marine vehicle platform. In some implementations, the hydrophone sensor array can be external to the marine vehicle platform. In other implementations, the hydrophone sensor array can be towed by the marine vehicle platform. Additionally, or alternatively, one or more hydrophone sensor arrays can be utilized and the received acoustic signals can be integrated for autonomous processing in real-time using the system and method of joint detection-classification and tracking described herein. In some implementations, the marine vehicle platform can be propelled using an electric-motor driven propeller. In other implementations, a buoyancy-driven propulsion engine can be utilized to propel the marine vehicle platform. In some implementations, the marine vehicle platform may be propelled using wave energy. In other implementations the marine vehicle platform may be a vessel operating at the surface of the water.

FIG. 1 is a diagram of an exemplary system configuration for autonomous joint detection-classification, and tracking of targets of interest using a marine vehicle platform. In broad overview, the illustrated system configuration 100 includes (i) a marine vehicle platform 102, (ii) a signal processing system 104, and (iii) a hydrophone sensor array 106. The hydrophone sensor array 106 includes individual hydrophone sensors 108*a*-108*e* (generally referred to as hydrophone sensors 108). The hydrophone sensors 108 are connected to marine vehicle platform 102 by connection means 110.

Referring to FIG. 1, in more detail, the system configuration 100 for autonomous joint detection-classification, and tracking of targets of interest includes a marine vehicle platform 102 connected to hydrophone sensor array 106. Marine vehicle platform 102 can be an unmanned undersea vehicle (UUV) or an autonomous underwater vehicle (AUV). Marine vehicle platform 102 can be a submerged vehicle or a surfaced vehicle. The power supply for propelling the marine vehicle platform 102 can be an electrical power supply, such as an onboard battery. Additionally, or alternatively, the marine vehicle platform 102 can be propelled using a buoyancy-driven propulsion engine, such as a glider-based vehicle. Examples of marine vehicle platforms, such as marine vehicle platform 102, include but are not limited to commercial off-the-shelf vehicle platforms, e.g., the REMUS® 100 and REMUS® 600 vehicles manufactured by Hydroid Inc., a Kongsberg Co. of Pocasset, Mass., the Bluefin UUVs manufactured by Bluefin Robotics Corporation of Quincy, Mass., the SLOCUM G2, G3 and 200 glider vehicles manufactured by Teledyne Webb Research of East Falmouth, Mass., the Seaglider™ vehicles manufactured by the University of Washington Applied Physics Laboratory, and the Wave Glider® vehicles manufactured by Liquid Robotics of Sunnyvale, Calif. The signal processing components and functionality described herein can be implemented on a variety of vehicle platforms and are not limited to specific vehicle configurations.

As further shown in FIG. 1, the marine vehicle platform 102 includes a signal processing system 104. The signal processing system 104 includes a plurality of computing components configured to receive and process the acoustic signals transmitted from the hydrophone sensor array 106. The plurality of computing components configured in signal processing system 104 include advanced signal processing algorithms capable of autonomously receiving and processing acoustic signal data from hydrophone sensor array 106 in real-time in order to jointly detect (e.g., detect sound sources) and classify (e.g., identify or characterize the acoustic signal source such as a marine mammal or geophysical phenomenon, or a surface vessel) targets of interest. The plurality of computing components configured in signal processing system 104 are further configured to track (e.g., determine the location and/or trajectories of targets of interest as functions of time), and output, or exfiltrate, target data for use elsewhere. The signal processing system 104 can receive power from the power supply included in the marine vehicle platform 102 or can include its own power supply. Additionally, the signal processing system 104 includes a digital data recorder or memory capable of storing acoustic signal and target of interest data. The memory included in signal processing system 104 can also store computer-readable instructions that when executed cause the plurality of computing components to perform autonomous joint detection-classification, tracking and output of acoustic signal and target of interest data according to the method disclosed herein.

Still referring to FIG. 1, the system configuration for autonomous joint detection-classification, and tracking of targets of interest 100 includes the hydrophone sensor array 106. The hydrophone sensor array 106 includes a plurality of individual hydrophone sensors, for example hydrophone sensors 108a-108e, generally known as hydrophone sensors 108. The hydrophone sensor array 106 can be towed by marine vehicle platform 102 using low drag cables. In some implementations, the hydrophone sensor array 106 can be mounted to marine vehicle platform 102. The means of connection can further include a data cable to facilitate transmission of the digitized acoustic signal data collected by hydrophone sensors 108 to the signal processing system 104. In some implementations, the hydrophone sensor array 106 is a multi-channel hydrophone sensor array, where each hydrophone sensor 108 is configured with one or more communication channels to transmit acoustic signals to the marine vehicle platform. In other implementations the hydrophone sensor array 106 is a linear or planar hydrophone sensor array. The advanced signal processing algorithms included in signal processing system 104 are capable of autonomously receiving and processing acoustic signal data according to the method described herein are further configured with one or more beamformers configured to measure signals in horizontal or vertical spatial apertures. The hydrophone sensor array 106 can be configured as a passive acoustic hydrophone sensor array or an active acoustic hydrophone sensor array with the inclusion of an adequate sound transmitter.

FIG. 1 further depicts a plurality of individual hydrophone sensors 108a-108e, generally known as hydrophone sensors 108. Each individual hydrophone sensor is a hydrophone receiver capable of receiving acoustic signal data generated by targets of interest. Hydrophone sensors 108 can be configured to operate (in the air as a microphone) at the surface (e.g., positively buoyant, floating or towed at the surface) as well as a neutrally-buoyant array (e.g., floating or towed below the surface), or fixed on the seabed. Hydrophone sensors 108 can include omnidirectional, gradient, horizontal, as well as other directionally oriented line array type receivers. Hydrophone sensors 108 with a horizontal aperture (e.g. fixed or towed horizontal line arrays or directional sonobuoys), can calculate the bearing of an acoustic signal as well and therefore track the target of interest in near real time. The use of multiple hydrophone sensors 108 can produce a more accurate estimate of the location of the acoustic signal and target of interest than an estimate of location produced by a single, individually deployed hydrophone sensor. Multiple hydrophone sensors can detect targets of interest in environments where a higher level of noise exists compared to single hydrophone sensors because an array of sensors can utilize array gain to rejection noise present in a received acoustic signal. In some embodiments, an array as shown may operate at relatively low frequencies, e.g., DC through about 1 kHz. In some embodiments, multiples arrays may be used together, with each array being configured to operate at a different range of operational frequencies. For example, a relatively high frequency array (HFA) such as a 5×5 Mill Cross Array operational over a range of about 1 kHz to about 90 kHz (with a nominal detection frequency of 50 kHz) can be used with the previously described low frequency array. Note: arrays may be configured for desired maximum depths, e.g., 1000 m, 2000 m, etc. Additionally, or alternatively, a single hydrophone sensor 108 can be utilized to perform autonomous joint detection-classification. In such a single-hydrophone configuration, the system lacks the ability to spatially locate targets of interest in bearing without further triangulation of the acoustic signal with other hydrophone sensors.

FIG. 1 includes a connection means 110 to link the hydrophone sensor array 106 to the marine vehicle platform 102. In some implementations, the connection 110 can include a cable to tow the hydrophone sensor array 106 behind the marine vehicle platform 102. The tow cable includes a strength member and a telemetry cable. The strength member can include a cable such as a nylon cable, Kevlar® cable, Spectra® cable, steel wire, or other high tensile strength cable to enable towing of the hydrophone sensor array 106 by the marine vehicle platform 102. The telemetry cable can include a cable such as a coaxial, serial, or Ethernet cable, or the like, to facilitate or provide for transmission of acoustic signal and target data from the hydrophone sensors 108 to the signal processing system 104 included in the marine vehicle platform 102.

Figure 2:
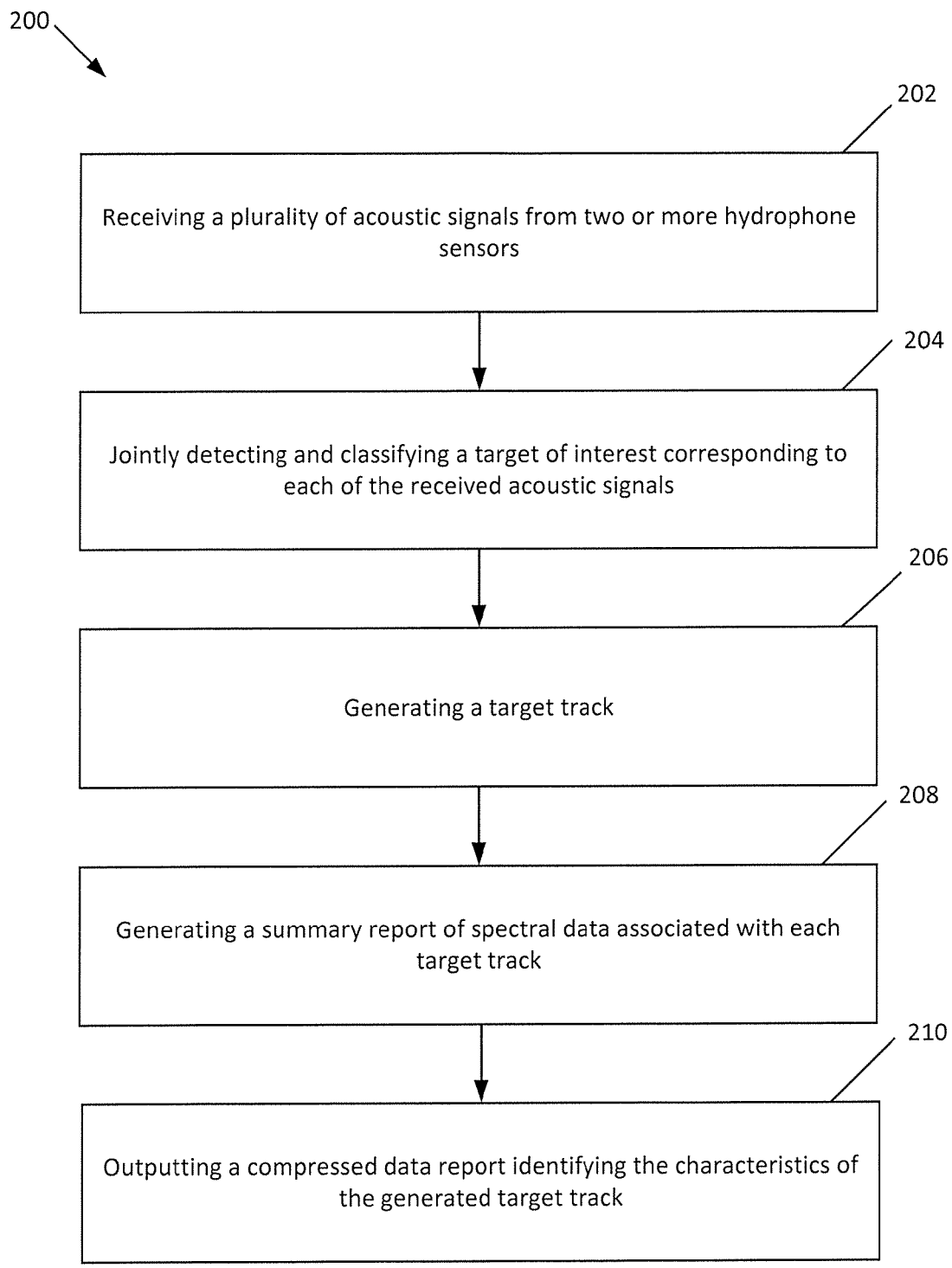
FIG. 2 is a flowchart of an exemplary method of autonomous joint detection-classification, and tracking of targets of interest.

FIG. 2 is a flowchart of an exemplary method of autonomous joint detection-classification, and tracking of targets of interest that can be implemented on a marine vehicle platform (e.g., the marine vehicle platform 102 of FIG. 1). The method 200 includes receiving a plurality of acoustic signals from two or more hydrophone sensors (stage 202) and jointly detecting and classifying a target of interest corresponding to each of the received acoustic signals (stage 204). In some implementations, the method 200 further includes generating a target track (stage 206) and further classifying each target track by analyzing the spectrum of each target track (stage 208). In some implementations, the method 200 also includes outputting a compressed data report identifying the characteristics of the generated target track (210).

The method 200 includes receiving a plurality of acoustic signals from two or more hydrophone sensors (stage 202). In some implementations, a plurality of acoustic signals can be received at two or more hydrophone sensors, such as hydrophone sensors 108. The acoustic signal is generated by a target of interest that is generating acoustic energy within the range of detection of the hydrophone sensor 108. For example, a ship can be operating on the surface of the ocean within the range of detection of the hydrophone sensor array 106. The acoustic signal generated by the operation of the ship (e.g., the acoustic signal created by the ship's propeller rotating in the water) can be received by the two or more hydrophone sensors 108. In some implementations, the acoustic signal that is received by the two or more hydrophone sensors 108 is transmitted autonomously and in real-time to the marine vehicle platform 102 as input to the digital signal processing algorithms implemented in the signal processing system 104 that is configured in the marine vehicle platform 102.

The method 200 also includes jointly detecting and classifying a target of interest corresponding to each of the received acoustic signals (stage 204). In some implementations, the signal processing system 104 included in the marine vehicle platform 102 can be configured with embedded processors storing computer readable instructions, which when executed implement digital signal processing algorithms capable of performing autonomous joint detection-classification of a target of interest based on the acoustic signals received from the two or more hydrophone sensors 108. The signal processing algorithms can be implemented to transform the received acoustic signals into spectral responses in the frequency domain that are tested against the classifier hypothesis to determine a detection surface which spatially identifies the presence of a target of interest in bearing and time. The spectral response of a signal is the power spectrum of beamformer output corresponding to a given relative bearing. For background and details of certain known beamforming techniques, see, e.g., Kneipfer, R., "Sonar Beamforming—An Overview of Its History and Status," Naval Undersea Warfare Center-NL Technical Report 10,003, (Apr. 7, 1992); and U.S. Pat. No. 6,980,486, both of which documents are incorporated herein by reference in their entireties. In some implementations, the spectral responses can be integrated according to their frequency to compute a detection surface in bearing and time corresponding to the target of interest associated with the received acoustic signals. The subsequent association of detection events summarized by the decision surface is performed to generate a target track. Additional details describing the method of detecting a target of interest is presented in relation to FIG. 3.

As further shown in FIG. 2, the method includes generating a target track (stage 206). A target track is a time series of target radiated noise (plus other ambient noise) signature along a target track resulting from an inverse FFT being applied to a scissorgram. A scissorgram is a time-frequency plot of the spectrum along a target track the term "scissorgram" connotes the cutting and splicing of instantaneous spectrum slices from different beams as a function of time as a target transits through beamspace. The digital signal processing algorithms implemented in the signal processing system 104 can utilize the detection surface calculated in stage 204 to track the location of the target of interest. In some implementations, a target track can be computed by associating the spatial and spectral characteristics of each detection surface to produce a relative-bearing track as a function of bearing and time. A relative-bearing track represents the locus of detection events that have been associated sequentially into a group of points that estimate the bearing history of a detected target. The relative-bearing track can be reconciled with an estimate of the orientation of the hydrophone sensor array to calculate a true bearing of the acoustic signal source which can be used to track the position of the target of interest. Additional details describing the method of tracking the location of a target of interest are presented in relation to FIG. 4.

The method 200 further includes generating a summary report of spectral data associated with each target track (stage 208) and outputting a compressed data report identifying the spectral characteristics of the generated target track (stage 210), such as those present in the scissorgram. In some implementations, the summary report can include any number of user-defined or user-selected parameters associated with the spectral characteristics of each generated target track. Additionally or alternatively, the summary report can include any uniquely identifying spectral characteristics of the detected target's radiated noise spectrum (e.g. fundamental frequency, harmonic indices, highest SNR feature, etc.). The compressed data report can include any data that is present in the generated summary report as well as characteristics of the target track including, but not limited to, time-stamp data, marine vehicle platform position or location data, relative bearing of acoustic signal source, the key identifying frequency of the acoustic signal generated by the source, the classifier type, the target of interest classification type (e.g., a vessel or ship, a marine mammal, or a geological phenomenon) and a classifier confidence score. The confidence score can be represented as probability or percentage. The confidence score is intended to characterize the accuracy or likelihood that the target of interest that has been classified by the system is identified as the actual or correct target of interest type. In some implementations, the compressed data report can be a concise report configured for output as a minimally sized file or data structure (e.g., 100 bytes or less). The small size of the compressed data report or file can facilitate data or file transmission in operating environments or over communication channels where bandwidth is limited. Additionally, or alternatively, the signal processing system 104 (shown in FIG. 1) can be configured to generate and output the compressed data report at pre-determined time intervals, such as once every five seconds, once every minute, once every hour, etc.

Figure 3:
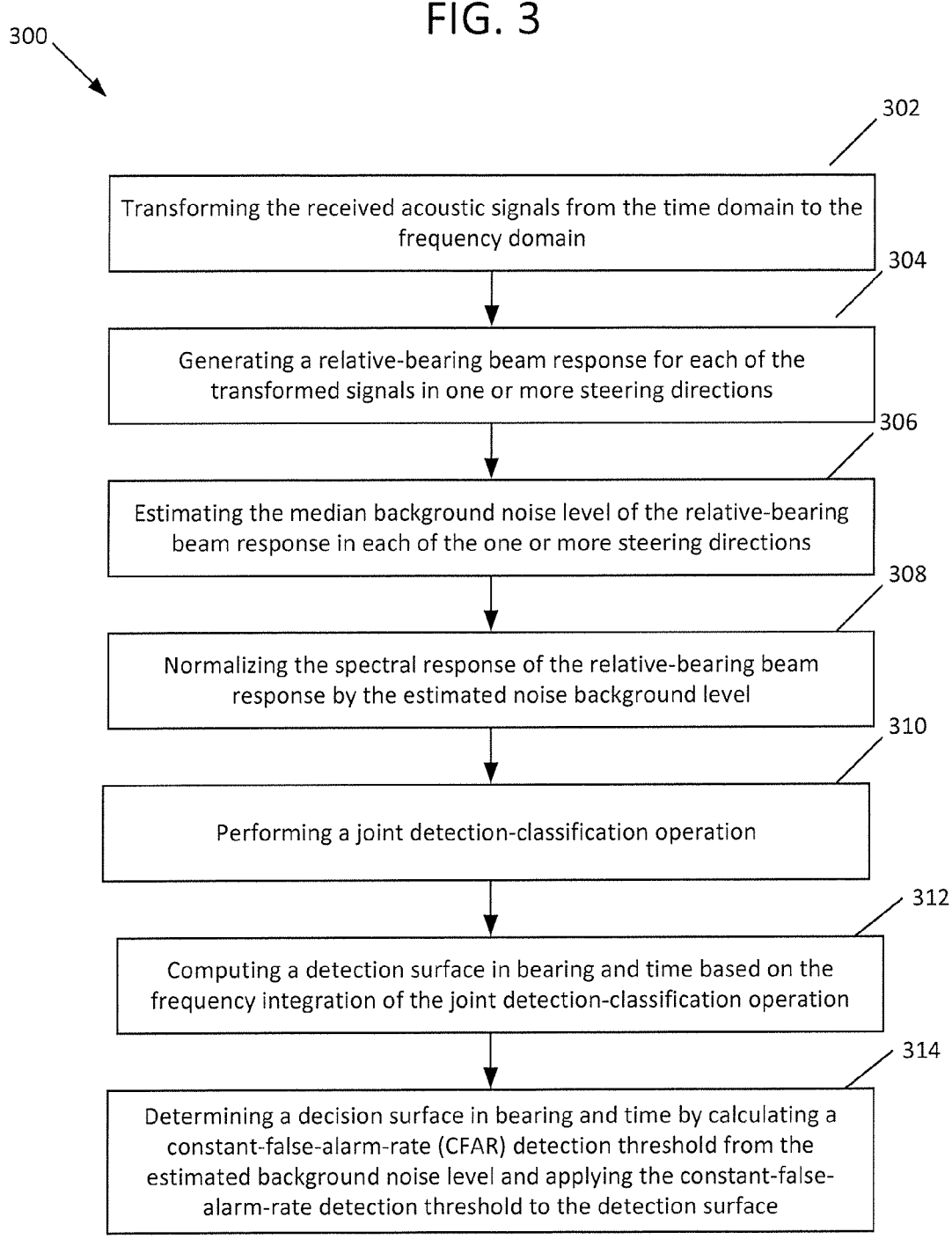
FIG. 3 is a flowchart of an exemplary method of autonomous joint detection-classification of a target of interest corresponding to each of the respective received acoustic signal.

FIG. 3 is a flowchart of a method 300 of autonomous joint detection-classification of a target of interest corresponding to received acoustic signals. The method 300 includes transforming the received acoustic signal from the time domain to the frequency domain (stage 302). The method also includes generating a relative-bearing beam response for the transformed signals in one or more steering directions (stage 304). The method also includes estimating the median background noise level of the relative-bearing beam response in each of the one or more steering directions (stage 306) and normalizing the spectral response of the relative-bearing beam response by the estimated noise background level (stage 308). The method further includes performing a joint detection-classification operation (stage 310) and computing a detection surface in bearing and time based on the frequency integration of the join detection-classification operation (stage 312). The method also includes determining a decision surface in bearing and time by calculating a constant-false-alarm-rate (CFAR) detection threshold from the estimated background noise level and applying the constant-false-alarm-rate (CFAR) detection threshold to the detection surface (stage 314).

The method 300 includes transforming a received acoustic signal from the time domain to the frequency domain (stage 302, with "stage" including reference to a software module where context permits). The received acoustic signals are transformed using a Fourier transform, such as a fast Fourier transform (FFT). The method 300 also includes generating a relative-bearing beam response for the transformed signals in one or more steering directions (stage 304). For example, the received acoustic signals can be transformed using frequency domain or time domain beamforming to generate a relative-bearing or conical beam response in multiple beam steering directions. The relative-bearing beam response is the output of the beamformer as a function of bearing for a given frequency. The relative-bearing beam response is determined by multiplying an M×N beamformer steering matrix (where M represents the number of beams and N represents the number of sensors in the acoustic array) with an N×1 hydrophone sensor array measurement resulting in a M×1 complex vector of beamformer output response. The beam steering direction is the relative bearing angle associated with a given beamformer steering vector. The beamforming steering vector is an N×1 column vector of complex spatial filter coefficients (e.g., one column of the N×M steering matrix mentioned above) that is conjugate-transposed and multiplied against an N×1 element hydrophone array vector snapshot to yield a complex, scalar-valued beam response for a given relative bearing. The magnitude-squared of this complex value is the beamformer output power at this bearing. In some implementations, the acoustic signals can be transformed to generate a relative-bearing beam response in one or more beam steering directions spanning the azimuthal space from forward endfire to aft endfire. In other implementations, the spatial filtering operation can include a linear or conventional method for computing the spatial filter weighting coefficients. In some implementations, the spatial filtering operation can include a data adaptive method for computing the spatial filter weighting coefficients of the beamformer required to generate the desired relative bearing beam response.

In some implementations, the acoustic signal is conditioned prior to performing the spatial filtering operation. For example, the received acoustic signals can be automatically conditioned to detect and remove bias from the signal. In other implementations, the received acoustic signal can be conditioned to shade an inoperative channel. In some implementations, the received acoustic signal can be conditioned for transient suppression or to perform sub-aperture phase alignment of the acoustic signal prior to further processing. In other implementations, the received acoustic signal can be conditioned to share all channels for suppression of sidelobes in the beamformer output.

In some implementations, a three-dimensional soundscape can be created based on the spatial filtering operations. The three-dimensional soundscape can quantify the distribution of sound in the horizontal and vertical bearing directions as associated with the target track or time series data corresponding to each acoustic signal.

The method 300 further includes estimating the median background noise level of the relative-bearing beam response in each of the one or more steering directions (stage 306). In some implementations, the noise spectrum of the relative-bearing beam responses is equalized by estimating the median background noise level in each steering direction. The method 300 also includes normalizing the spectral response of the relative-bearing beam response by the estimated noise background level (stage 308). In some implementations, a frequency-dependent, relative-bandwidth, median-filter based spectrum normalizer is utilized to normalize the spectral response of the relative-bearing beam responses. For example, the spectrum normalizer as described, provides improved noise spectrum whitening performance compared to other spectrum normalizers due to its ability to more accurately estimate and remove temporal fluctuations in the dynamic background noise level. This improved functionality is particularly useful in cluttered or high-noise marine environments for detecting low frequency acoustic signals where background noise spectral coloring can vary rapidly with time and frequency.

The method 300 also includes performing a joint detection-classification operation (software module, or stage, 310). A joint detection-classification operation is performed consisting of a selective frequency integration of the normalized spectral responses associated with each relative-bearing beam response such that the frequency integration is informed, filtered, or constrained by the detailed physics of the underlying classifier for the target of interest to satisfy a spatial and/or spectral target hypothesis of the classifier. The classifier indicates radiated noise characteristics or physics, such as the narrowband tonal set membership of a harmonic fingerprint for example, that are output from a classifier associated with the target of interest. For example, by utilizing the detailed physics data that is output from the classification algorithm in conjunction with the highly-selective frequency integration ensures that only the energy best satisfying the spatial and spectral hypothesis/hypotheses (assumptions) of the classifier is permitted to be used in the frequency integration. In this way, the frequency integration is enhanced, or informed by the radiated noise characteristics of the target yielding a summed relative-bearing beam response that exhibits maximal signal-to-noise ratio, superior spatial resolution, and is uniquely associated with the acoustic source or target of interest described by the classifier algorithm. This technique more accurately differentiates the acoustic signal associated with a target of interest from the presence of noise in a received acoustic signal resulting in increased detection sensitivity in regard to the acoustic signal source of interest. A wide variety of classifiers (classification algorithms or libraries of a priori acoustic data, e.g., harmonic signatures for a particular acoustic source of interest) can be used; a specific classifier can be chosen based on the desired target of interest to be detected, classified and tracked. In some implementations, multiple classifiers can be used, simultaneously or sequentially, to detect and simultaneously classify multiple targets of interest.

The method 300 includes computing a detection surface in bearing and time based on the frequency integration of the joint detection-classification operation (stage 312). A detection surface is a two-dimensional bearing vs. time record (BTR) plot of the frequency-integrated relative bearing beam response showing the distribution of acoustic energy in bearing as a function of time. The BTR is the most commonly used as a scene awareness tool for summarizing the distribution of acoustic contacts. In some implementations, a frequency integration of the normalized spectral responses can be performed to compute a detection surface. In some implementations, the detection surface can be represented in bearing and time and can be associated with each relative-bearing beam response. In some implementations, the detection surface is computed using an advanced detection method which mitigates the sidelobe response of strong discrete sources of acoustic interference prior to the frequency integration of the normalized spectral response associated with each relative-bearing beam response.

The method includes determining a decision surface in bearing and time by calculating a constant-false-alarm-rate detection (CFAR) threshold from the estimated noise background level and applying the constant-false-alarm-rate (CFAR) detection threshold to the detection surface (stage 314). A decision surface is a thresholded detection surface, or a BTR of those detection events or pixels in the detection surface that exceeded the detection threshold. Pixels on the decision surface are the detection events that get associated into target tracks associated with a target. In some implementations, a constant-false-alarm-rate (CFAR) thresholding step can be calculated from the estimated noise background level and applied to the detection surface. The constant-false-alarm-rate (CFAR) detection threshold can be applied on a temporal scan-by-scan basis to the sidelobe adjusted detection surface to determine a corresponding decision surface in bearing and time corresponding to the detected target of interest. The sensitivity of the determined constant-false-alarm-rate (CFAR) detection threshold is increased due to the inherent screening potential of the spatial-spectral set membership when a parallel or joint detection-classification system and method are implemented as described herein. The benefit of increased constant-false-alarm-rate detection threshold sensitivity includes improvements to important performance characteristics such as enhanced target of interest hold time ratio as well as improved probability of correct classification for a fixed false alarm rate. For example, the joint detection-classification system and method only renders and outputs (for example, via a compressed data report) targets of interest that are consistent with the classifier criteria in the determined constant-false-alarm-rate (CFAR) detection threshold.

Figure 4:
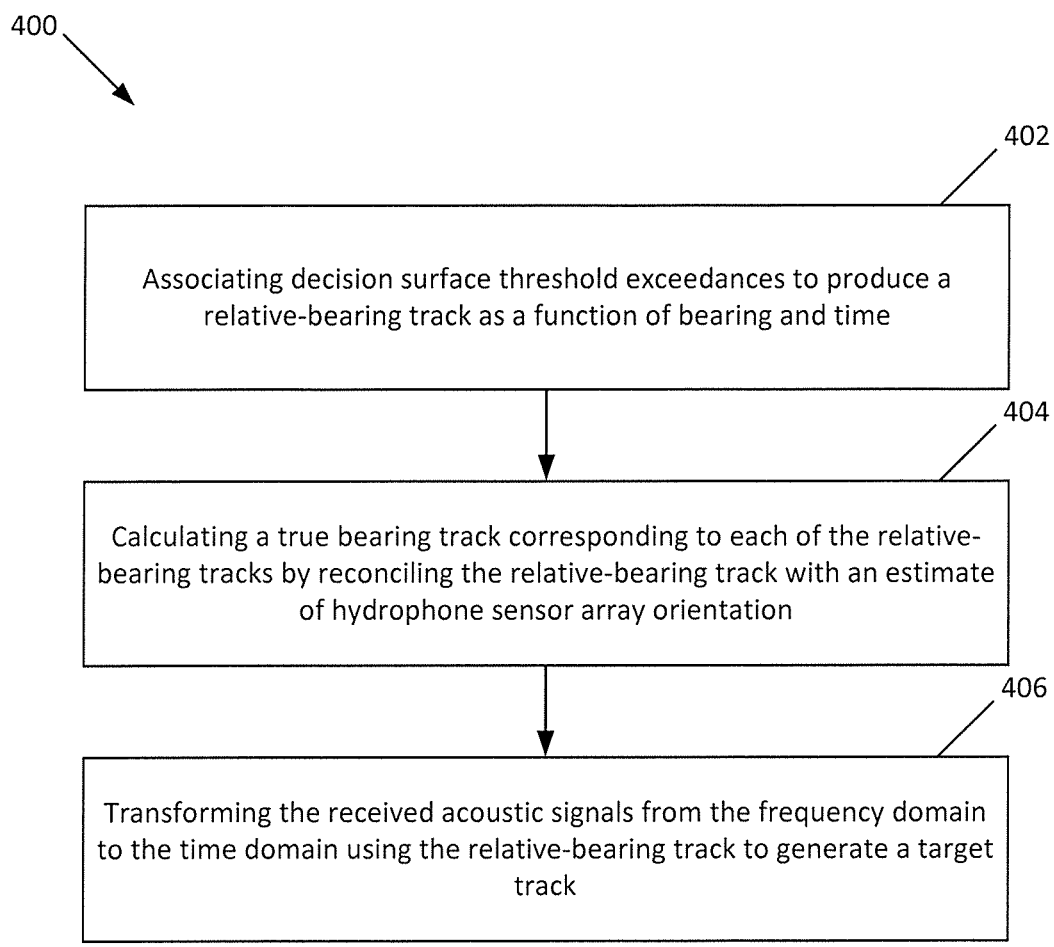
FIG. 4 is a flowchart of an exemplary method of generating a target track corresponding to the decision surface.

FIG. 4 is a flowchart of a method 400 for generating a target track corresponding to the decision surface. The method includes associating decision surface threshold exceedances to produce a relative-bearing track as a function of bearing and time (stage 402). The method also includes calculating a true bearing track corresponding to each of the relative-bearing tracks by reconciling the relative-bearing track with an estimate of hydrophone sensor array orientation (stage 404). The method further includes transforming the received acoustic signal from the frequency domain to the time domain using the relative-bearing track to generate a target track (stage 406).

The method 400 includes associating decision surface threshold exceedances to produce a relative-bearing track as a function of bearing and time (stage 402). In other implementations, a spatial tracking operation can be performed to associate instantaneous detection decisions on the basis of spectral proximity or similarity. As implemented in the joint detection-classification system and method, the spatial bandwidth of the association algorithm is permitted to vary with frequency, accounting for the fact that the beam response of the sensor array scales with the wavelength of the acoustic signal. For example, lower frequency features are afforded wider spatial tolerance than higher frequency ones. This has the effect of enhanced main lobe sensitivity and, thus, reduced susceptibility to instantaneous false alarms. In some implementations, a spatial tracking operation can be performed to associate instantaneous detection decisions on the basis of spatial proximity or similarity.

The method 400 includes calculating a true bearing track corresponding to each of the relative-bearing track by reconciling the relative-bearing track with an estimate of hydrophone sensor array orientation (stage 404). In some implementations, a unique estimate of the true bearing track can be determined by reconciling the relative-bearing track with an estimate of the instantaneous fluctuations in the orientation or position of the hydrophone sensor array 106.

The method 400 includes transforming the received acoustic signals from the frequency domain to the time domain using the relative-bearing track to generate a target track (stage 406). In some implementations an inverse fast Fourier transform (IFFT) algorithm is applied to the received acoustic signals or conditioned acoustic signals. In some implementations, the IFFT algorithm uses the relative-bearing track to compute a digital beam response time series. The computed digital beam response time series represents a target track corresponding to each target of interest. Additionally, or alternatively, a scissorgram can be generated and exported for any generated target track. A scissorgram is a spectrogram, computed from the target track, plotting the frequency of the target's acoustic signal as a function of time. In some implementations, the method can generate a target track for further classification.

Figure 5:
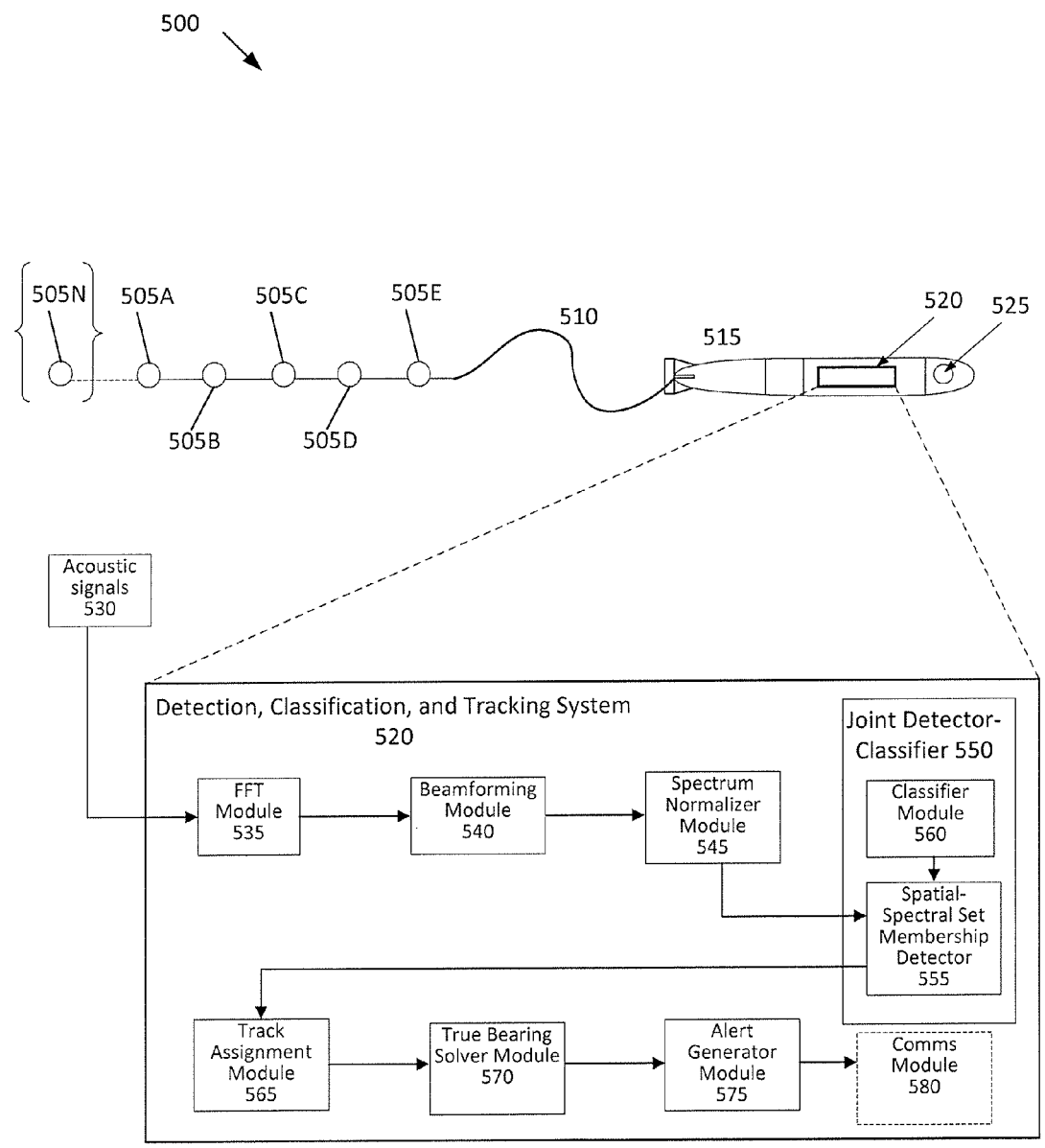
FIG. 5 is a diagram of an exemplary system configuration for receiving acoustic signals using a marine vehicle platform.

FIG. 5 is a diagram of an exemplary system configuration for receiving acoustic signals using a marine vehicle platform. In broad overview, the exemplary system configuration 500 includes one or more individual hydrophone sensors, for example a single hydrophone sensor such as hydrophone sensor 505N as shown in brackets or two or more hydrophone sensors 505A-505E, generally referred to as hydrophone sensors 505. The plurality of hydrophone sensors 505 are attached by a connection means such as a tow/data cable 510 to the marine vehicle platform 515. The marine vehicle platform 515 includes a detection, classification, and tracking system 520 to receive the transmitted acoustic signals in order to perform autonomous joint detection-classification and tracking in real-time on the received acoustic signals. The marine vehicle platform 515 further includes a GPS receiver 525. The detection, classification, and tracking system 520 includes an FFT Module 535 to receive acoustic signals 530 from the hydrophone sensors 505 and transform them to the frequency domain. The detection, classification, and tracking system 520 also includes beamforming module 540, spectrum normalizer module 545 and joint detector-classifier 550. The joint detector-classifier 550 includes classifier module 560 and spatial-spectral membership detector 555. The detection, classification, and tracking system 520 also includes track assignment module 565, true bearing solver module 570 and alert generator module 575. The marine vehicle platform may also include a communications ("comms") module 580 to output acoustic signal and target data for use elsewhere at locations remotely situated from the marine vehicle platform 515.

Referring to FIG. 5 and FIG. 2, a plurality of hydrophone sensors 505 can be interconnected to form an array of hydrophone sensors. The array of hydrophone sensors can include one or more acoustic sensors, e.g., individual hydrophone sensors 505, interconnected by cables or other attachment means linking individual hydrophone sensors 505 to form a hydrophone sensor array, for example, such as hydrophone sensor 106 described in relation to FIG. 1. Each hydrophone sensor 505 includes a hydrophone receiver (not shown) which acts as microphone to record acoustic signals in marine environments. In some implementations, the array of hydrophone sensors 505 can include multi-channel hydrophone sensors, linear hydrophone sensors, planar hydrophone sensors, mobile hydrophone sensors, and/or fixed hydrophone sensors. Additionally, or alternatively, the hydrophone sensors included in the array of hydrophone sensors 505 can each include an analog-to-digital converter to process the received acoustic signal and transform the received signal to digital signal data for transmission to the detection, classification and tracking system 520. In some implementations, the hydrophone sensor array 505 can further include non-acoustic sensors such as sensor components to determine position or orientation data of the array such as heading, pitch, roll and depth.

As shown in FIG. 5, the collection of hydrophone sensors 505 configured as a hydrophone sensor array are linked or joined by connection or attachment means 510 to marine vehicle platform 515. In some implementations, a cable is used to link the collection of hydrophone sensors 505, formed as an array, to the marine vehicle platform 515. In some implementations, the hydrophone sensor array can be towed by the marine vehicle platform 535. In other implementations, a data or telemetry cable may connect the hydrophone sensor array to the marine vehicle platform 515. For example, a coaxial, serial or Ethernet data cable can be configured to transmit digitized acoustic signals from the hydrophone sensor array 505 to the marine vehicle platform 515. In some implementations, the hydrophone sensor array is external to the marine vehicle platform 515. In other implementations, the hydrophone sensor array is mounted to the marine vehicle platform 515. For example, a hydrophone sensors array may be mounted to the hull of an autonomous marine vehicle platform. The hydrophone sensor array may also be deployed (as a microphone sensor array) in air or above the surface of the marine environment.

Still referring to FIG. 5, the marine vehicle platform 515 can include autonomous or unmanned vehicles or vehicle platforms. The marine vehicle platform 515 can include submersible or surfaced vehicles or vehicle platforms. The marine vehicle platform 515 is similar to marine vehicle platform 102 described in relation to FIG. 1. The marine vehicle platform 515 can operate autonomously and can be propelled using an electric-motor driven propeller or a buoyancy-driven propulsion system. In some implementations, the vehicle platform may be a terrestrial or aerial vehicle platform. The vehicle platform may be a non-mobile, stationary platform. Additionally, or alternatively the vehicle platform can be remotely operated by an operator situated away from the location of the vehicle.

As shown in FIG. 5, the marine vehicle platform 515 further includes a detection, classification, and tracking system 520. For example, the detection, classification, and tracking system 520 can be included in signal processing system 104 as shown in FIG. 1. The detection, classification, and tracking system 520 receives acoustic signals 530 from hydrophone sensors 505 via a data or telemetry cable included in connection means 510. The detection, classification, and tracking system 520 includes a plurality of embedded processors configured with specialized digital signal processing algorithms to perform autonomously joint detection-classification, and tracking of a target of interest corresponding to each of the respective acoustic signals 530 received from the plurality of hydrophone sensors 505.

As further shown in FIG. 5, the marine vehicle platform 515 further includes a GPS receiver 525. The GPS receiver 525 accurately tracks the precise position of the marine vehicle platform 515 while it is at the surface. GPS data can be included in the compressed data report that is output from the detection, classification, and tracking system 520.

Referring to FIG. 5, the detection, classification, and tracking system 520 is configured to receive a plurality of acoustic signals 530 transmitted from hydrophone sensors 505. The transmitted acoustic signals 530 are received at the FFT module 535 and transformed from the time domain to the frequency domain. In some implementations, prior to transforming the acoustic signals from the time domain to the frequency domain, the acoustic signals are conditioned for bias detection and removal, inoperative channel shading, transient suppression, sidelobe suppression, and/or sub-aperture phase alignment. In some implementations, the received acoustic signals are recorded by a digital element recorder (not shown). The time series data associated with each acoustic signal 530 can be continuously recorded by the element recorder and post-processed at a later time.

As shown in FIG. 5, the detection, classification, and tracking system 520 also includes a beamformer module 540. The beamformer module 540 is a spatial filter configured to select acoustic sources in a given direction while suppressing acoustic sources in all other directions. The beamformer module 540 can generate a relative-bearing beam response for each of the transformed signals in one or more beam steering directions. In some implementations, the beamformer module 540 is a frequency domain beamformer. In other implementations, generating relative bearing beam response in one or more beam steering directions also includes linear or data-adaptive methods for computing the spatial filter weighting coefficients of each relative-bearing beam response.

As further shown in FIG. 5, the detection, classification, and tracking system 520 also includes a spectrum normalizer module 545. The spectrum normalizer module 545 can be a frequency-dependent, relative-bandwidth, median-filter based spectrum normalizer. The spectrum normalizer module 545 estimates the median background noise level of the relative-bearing beam response in each of the one or more beam steering directions and normalizes the spectral response of each relative-bearing beam response.

As shown in FIG. 5, the detection, classification, and tracking system 520 also includes a joint detector-classifier 550. The joint detector-classifier 550 includes a spatial-spectral set membership detector 555 and a classifier module 560. The spatial-spectral membership detector 555 performs frequency integration on the normalized spectral responses associated with each relative-bearing beam response by utilizing radiated noise characteristics and data output from classifier module 560.

The joint detector-classifier 550 shown in FIG. 5 further includes classifier module 560. Classifier module 560 includes or presents a classifier describing a priori and/or learned knowledge of the physics of a target of interest. For example, the classifier in the classifier module can be an algorithm or model describing the acoustic signature of a target of interest. The classifier module 560 can be a classifier library storing the radiated noise characteristics or attributes of a variety of different targets of interest. In some implementations, the classifier 560 may include attributes associated with a target of interest such as the range, depth, relative and/or true bearing, course, speed, frequency, range rate and/or whether the target of interest is located at the surface or submerged. Additionally, or alternatively, the classifier 560 may also include the fundamental frequency (of a harmonically related set of frequencies), Doppler (in the case of an active sonar return), and/or species identification data associated with a target of interest. For example, classifier module 560 can include classification data or profiles associated with recreational or commercial vessels, and marine wildlife such as whales, fish, or marine mammals. Additionally or alternatively, classifier module 560 may include classification data or profiles associated with geological phenomenon, such as hydrothermal vents or underwater volcanic activity. The classification data or profiles identify specific characteristics of the physics associated with the acoustic signal radiated from a target of interest. The classifier module 560 provides acoustic data associated with the desired target of interest as input to the spatial-spectral set member ship detector 555 in order to classify the target of interest in parallel with the frequency integration. In some implementations, classifier module 560 can employ harmonic fingerprint classifiers, linear classifiers, quadratic classifiers or kernel estimation techniques to accurately classify each target track representing a target of interest. The joint detection-classification system and method are configured such that the entire detection-classification string is implemented at the spectral resolution required by the most demanding classification algorithm.

As further shown in FIG. 5, the detection, classification, and tracking system 520 also includes a track assignment module 565. The track assignment module 565 can compute a detection surface in bearing and time based on the frequency integration. In some implementations, the method of computing the detection surface includes mitigating the sidelobe response of strong discrete sources of acoustic interference prior to the frequency integration of the normalized spectral response associated with each relative bearing beam response. The track assignment module 565 can calculate a constant-false-alarm-rate (CFAR) detection threshold based on applying the estimated noise background level to the detection surface and determine a decision surface in bearing and time based on the calculated constant-false-alarm-rate (CFAR) detection threshold resulting in a relative-bearing track of the target.

Still referring to FIG. 5, the detection, classification, and tracking system 520 also includes a true bearing solver module 570 to generate a true bearing target track corresponding to each decision surface. The true bearing solver module 570 determines which decision surfaces exceeding the constant-false-alarm-rate (CFAR) detection threshold can be associated based on spatial and spectral characteristics and produces a relative-bearing track as a function of bearing and time. The true bearing solver module 570 calculates a true bearing of the relative-bearing track by reconciling the relative-bearing tracks with an estimate of hydrophone sensor array orientation. The true bearing solver module 570 uses the decision surface to transform the acoustic signals from the frequency domain to the time domain in order to generate a target track reflecting the true location in bearing and time of the detected target of interest. In some implementations, the transformation of the acoustic signals from the frequency domain to the time domain is performed using an inverse Fast Fourier Transform algorithm.

As shown in FIG. 5, the detection, classification, and tracking system 520 includes alert generator module 575. In some implementations, the alert generator module 575 can generate a summary report of spectral data associated with each target track representing a target of interest. The alert generator module 575 can output a compressed data report identifying the characteristics of the generated target track included in the summary report using a communication module, such as comms module 580 (shown in dashed lines to indicate it is separate from the detection, classification, and tracking system 520). In some implementations, comms module 580 may be included as a communication module associated with the vehicle platform, such as marine vehicle platform 515. For example, comms module 580 can be an acoustic modem. In other implementations, comms module 580 can be a small-footprint, low-power modem or micro-modem capable of transmitting data at rates of 80-5400 bits per second. Additionally, or alternatively, the comms module 580 can include means for communicating via satellite communication, such using the Iridium satellite constellation. Depending on the configuration of the vehicle platform, the vehicle may be required to surface to transmit the compressed data report. In some implementations, the compressed data report is configured to be a minimal data size to facilitate transmission over bandwidth limited communication channels or in bandwidth limited operating environments. For example, the compressed data report file size can be configured to include a set of alert reports, each of which does not exceed 100 bytes. The alert generator module 575 can output the compressed data report via comms module 580 to a receiver situated remotely from the vehicle platform, such as marine vehicle platform 515. Additionally, or alternatively, the compressed data report can be user-configured or user-defined to specify the type of data associated with the target of interest and the received acoustic signal to be included in the compressed data report.

In some implementations, the detection, classification, and tracking system 520 is further configured to measure the location of a target of interest and allow later quantification of parameters associated with each generated target track including detection probability, detection false alarm probability, classification probability, classification false alarm probability, as well as system processing gain and bearing errors.

In some implementations, a system can be configured in a calibration mode as a separate surrogate target that is used to tune the detection, classification and tracking functionality performed by the embedded processors. For example, the system can be configured to transmit a time-synchronized acoustic signal that can be received by the hydrophone sensors 505. The use of a time-synchronized signal enables the system to accurately determine the precise bearing and frequency of the target of interest and tune the joint detector-classifier 550 to achieve increased detection and classification performance with a decreased classification false alarm rate. The surrogate system can be configured with different target of interest profiles (e.g., varying amplitude and frequency characteristics) to be transmitted and thereby enabling the joint detection-classification performance to be evaluated in regard to known targets of interest. Exemplary techniques and systems for suitable calibration are described in co-owned U.S. Pat. No. 7,760,587B2, which is incorporated herein by reference in its entirety.

Figure 6A:
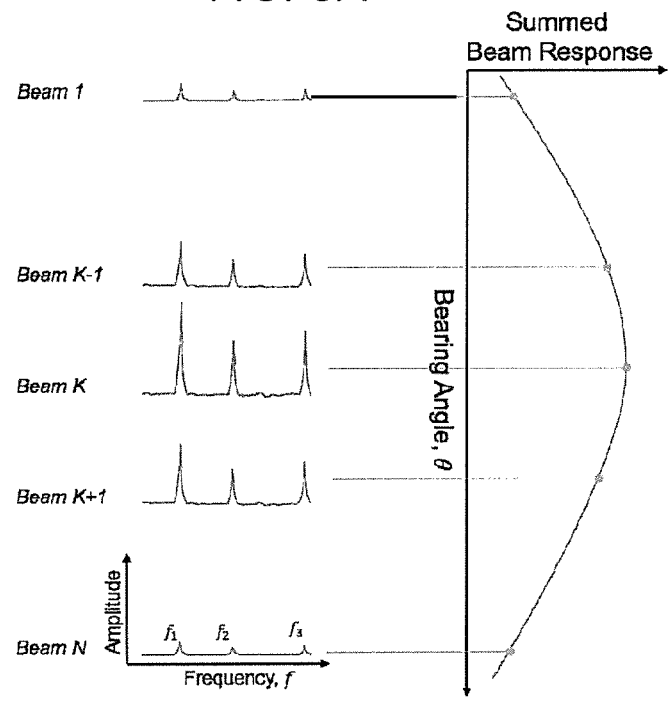
FIGS. 6A and 6B are diagrams demonstrating the calculation of an acoustic signal's frequency-integrated beam response by conventional and joint detection-classification methods as described herein.
Figure 6B:
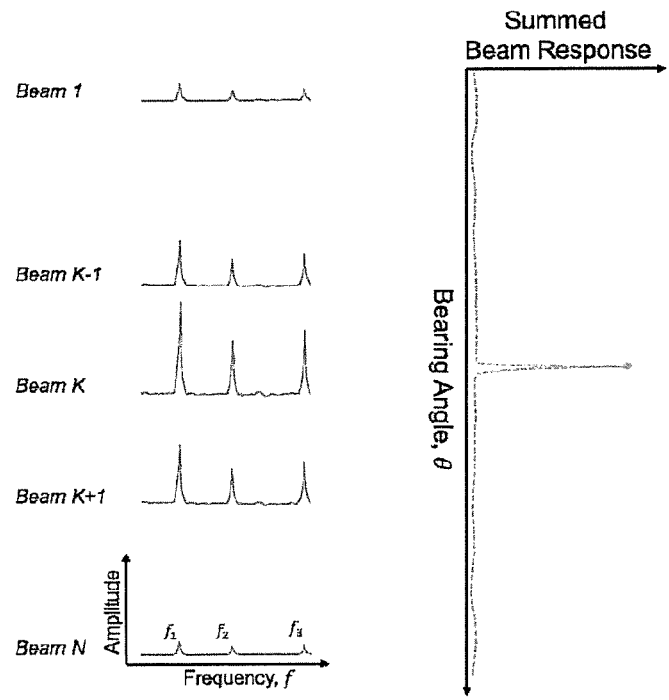

FIGS. 6A and 6B are diagrams demonstrating the calculation of an acoustic signal's frequency-integrated beam response by conventional methods and by joint detection-classification methods as described herein. As shown in FIGS. 6A and 6B, a given acoustic signal may be received by each hydrophone sensor in a hydrophone sensor array. The hydrophone sensors in the array each detect the signal and a beam response is generated by the detection, classification, and tracking system 520. The beam responses may be frequency-integrated or summed to generate a relative-bearing beam response as a function of time. As shown in FIGS. 6A and 6B, each beam response is represented as a plot of spectral energy in terms of amplitude and frequency. For example, Beam N is an acoustic signal including three distinct, harmonically related peaks (or related in some other manner as described by the classifier algorithm) occurring at frequencies f1, f2 and f3, respectively. As the marine vehicle platform towing the hydrophone sensor array navigates through the water, the acoustic signal is received by the plurality of hydrophone sensors in the array. For example, Beam 1 is the relative-bearing beam response generated by the detection, classification, and tracking system 520 in a particular direction. The relative beam response in the direction nearest to the target of interest emitting the acoustic signal will be the beam response with the greatest amplitude. As shown in FIGS. 6A and 6B, the beam response is greatest in Beam K. The amplitude of the beam responses associated with Beams K−1 and K+1 are less because the directions of the beam responses are father away from the target of interest emitting the acoustic signal. Methods and systems for calculating and displaying sonar data are described in U.S. Patent Publication No. US 2003/0227823A1, which is incorporated herein by reference in its entirety As shown in FIG. 6A, conventional methods of acoustic signal detection and classification sum the beam responses over all frequencies to report the level of the summed beam response relative to the bearing angle of the acoustic signal. In this manner, the summed beam responses are not very sensitive to the direction of the targets of interest and may lead to missed detections in noisy environments.

As shown in FIG. 6B, the joint detection-classification method sums the beam responses only over the frequencies that best bit the classifier hypothesis. Additionally, these frequencies are integrated only for the beam response at which they are maximal, e.g., Beam K. For example, by performing frequency integration utilizing the radiated noise characteristics output from a classifier associated with a given target of interest in parallel only the frequencies at one bearing most strongly correlated with the classifier output are included in the summed beam response. As described, the joint detection-classification method can result in more precise estimation of the direction associated with the detected acoustic signal (e.g., the target of interest). Systems and methods configured with the joint detection-classification functionality described herein enable acoustic signals to be classified with greater accuracy in the presence of higher noise levels and with decreased false alarm rates such that the overall system and method are more robust compared to conventional techniques for acoustic signal detection.

Figure 7:
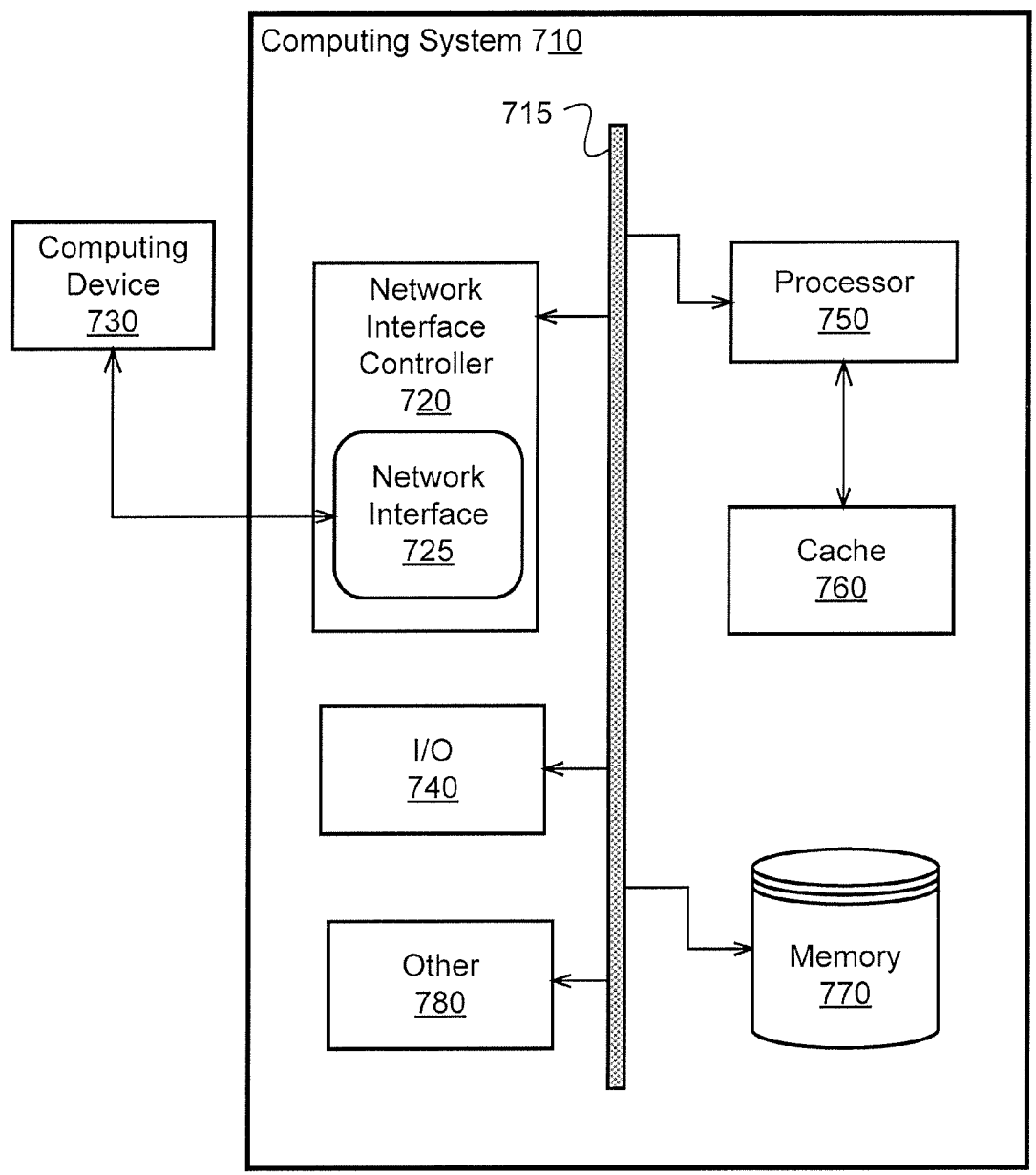
FIG. 7 is a block diagram of a computing system in accordance with an illustrative implementation.

FIG. 7 is a block diagram of a computing system 710 suitable for use in implementing the computerized components described herein. In broad overview, the computing system 710 includes at least one processor 750 for performing actions in accordance with instructions, and one or more memory devices 760 and/or 770 for storing instructions and data. The illustrated example computing system 710 includes one or more processors 750 in communication, via a bus 715, with memory 770 and with at least one network interface controller 720 with a network interface 725 for connecting to external devices 730, e.g., a computing device (such as a hydrophone digitizer). The one or more processors 750 are also in communication, via the bus 715, with each other and with any I/O devices at one or more I/O interfaces 740, and any other devices 780. The processor 750 illustrated incorporates, or is directly connected to, cache memory 760. Generally, a processor will execute instructions received from memory.

In more detail, the processor 750 can be any logic circuitry that processes instructions, e.g., instructions fetched from the memory 770 or cache 760. In many embodiments, the processor 750 is an embedded processor, a microprocessor unit or special purpose processor. The computing system 710 can be based on any processor, e.g., suitable digital signal processor (DSP), or set of processors, capable of operating as described herein. For example, suitable implementations of processor 750 can include processors such as the included in an ODROID platform (e.g., the ODROID-XU4, ODRIOD-C2, and/or ODROID-C1+) as made commercially available by the Hardkernel Co., Ltd. of South Korea; other suitable processors and processor platforms may be used. In some embodiments, the processor 750 can be a single core or multi-core processor. In some embodiments, the processor 750 can be composed of multiple processors.

The memory 770 can be any device suitable for storing computer readable data. The memory 770 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 710 can have any number of memory devices 770.

The cache memory 760 is generally a form of high-speed computer memory placed in close proximity to the processor 750 for fast read/write times. In some implementations, the cache memory 760 is part of, or on the same chip as, the processor 750.

The network interface controller 720 manages data exchanges via the network interface 725. The network interface controller 720 handles the physical and data link layers of the Open Systems Interconnect (OSI) model for network communication. In some implementations, some of the network interface controller's tasks are handled by the processor 750. In some implementations, the network interface controller 720 is part of the processor 750. In some implementations, a computing device 710 has multiple network interface controllers 720. In some implementations, the network interface 725 is a connection point for a physical network link, e.g., an RJ 45 connector. In some implementations, the network interface controller 720 supports wireless network connections and an interface port 725 is a wireless receiver/transmitter. Generally, a computing device 710 exchanges data with other network devices 730, such as computing device 730, via physical or wireless links to a network interface 725. In some implementations, the network interface controller 720 implements a network protocol such as Ethernet.

The other computing devices 730 are connected to the computing device 710 via a network interface port 725. The other computing device 730 can be a peer computing device, a network device, or any other computing device with network functionality. For example, a computing device 730 can be a digital hydrophone sensor or hydrophone digitizer, an array of digitized hydrophone sensors or a network device such as a hub, a bridge, a switch, or a router, connecting the computing device 710 to a data network such as the Internet.

In some uses, the I/O interface 740 supports an input device and/or an output device (not shown). In some uses, the input device and the output device are integrated into the same hardware, e.g., as in a touch screen. In some uses, such as in a server context, there is no I/O interface 740 or the I/O interface 740 is not used. In some uses, additional other components 780 are in communication with the computer system 710, e.g., external devices connected via a universal serial bus (USB).

The other devices 780 can include an I/O interface 740, external serial device ports, and any additional co-processors. For example, a computing system 710 can include an interface (e.g., a universal serial bus (USB) interface, or the like) for connecting input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/O device is incorporated into the computing system 710, e.g., a touch screen on a tablet device. In some implementations, a computing device 710 includes an additional device 780 such as a co-processor, e.g., a math co-processor that can assist the processor 750 with high precision or complex calculations.

The components, steps, features, benefits, and advantages which have been discussed are merely illustrative. None of them, or the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

For example, while the foregoing description has been provided in the context of processing acoustic data, related to under-water targets or sources of interest, that is received from under-water acoustic sensors and sensor arrays, systems and methods according to the present disclosure can also provide for similar processing of acoustic data in non-marine environments, e.g., where acoustic data related to acoustic sources of interest (in air) is received from acoustic arrays that are not submerged.

In some implementations, the system and method described herein can be used to perform autonomous joint detection-classification, and/or tracking of acoustic sources located outside of the water (liquid). For such embodiments the hydrophone sensor array is replaced by one or more suitable acoustic sensor arrays, e.g., a microphone sensor array, configured to collect acoustic data for another sound-conveying medium, e.g., air, or the Earth (for seismic data), etc. In one example, a microphone array may be configured on a marine vehicle platform (which could also have or be linked to one or more sub-surface hydrophone arrays as described previously). The marine vehicle platform can surface to position the microphone sensor array above the water such that acoustic signals generated from targets of interest above or outside of the water can be autonomously processed according to the joint detection-classification and tracking system and method of the present disclosure. For example, the marine vehicle platform can operate in the littoral zone of a body of water in order to detect, classify and track acoustic signals from targets of interest located near, but not residing in, the littoral zone. The marine vehicle platform can position itself such that the attached microphone sensor array can receive acoustic signals originating outside of the littoral zone of the water, such as acoustic signals originating from terrestrial targets of interest that are situated on land in close proximity to the water. In other embodiments, a single acoustic sensor can be used alone for joint detection-classification of one or more acoustic sources of interested, without performing a step of tracking.

Implementations of the subject matter and the operations described in this specification can be implemented in digital or analog electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. In exemplary embodiments, the C programming language can be used; in other embodiments, different suitable programming languages can be used, including, but not limited to: C++, C#, PASCAL, FORTRAN, MATLAB, Octave, Scilab, Julia, VHDL, Verilog, System-C, or the like. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium can be tangible and non-transitory.

The operations described in this specification can be implemented as operations performed by a data processing apparatus on data stored on one or more computer-readable storage devices or received from other sources.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

References to "or" can be construed as inclusive so that any terms described using "or" can indicate any of a single, more than one, and all of the described terms. The labels "first," "second," "third," and so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

What is claimed is:

1. A method for autonomous joint detection-classification and tracking of targets of interest, the method comprising:
receiving a plurality of acoustic signals from two or more hydrophone sensors, each of the respective acoustic signals characterized by time-series data;
detecting a target of interest from the received acoustic signals by:
transforming the received acoustic signals from the time domain to the frequency domain;
generating a relative-bearing beam response for each of the transformed signals in one or more beam steering directions;
estimating the median background noise level of the relative-bearing beam response in each of the one or more beam steering directions and normalizing the spectral response of the relative-bearing beam response by the estimated background noise level, wherein a normalized spectral response is produced that is associated with each relative-bearing beam response;
performing a joint detection-classification operation, wherein the joint detection-classification operation comprises a selective frequency integration of the normalized spectral response associated with each relative-bearing beam response, wherein the frequency integration is informed by the detailed physics of the underlying classifier for the target of interest to satisfy a spatial and spectral target hypothesis of the classifier;
computing a detection surface in bearing and time based on the frequency integration of the joint detection-classification operation; and
determining a decision surface in bearing and time by calculating a constant-false-alarm-rate (CFAR) detection threshold from the estimated noise background level and applying the constant-false-alarm-rate detection threshold to the detection surface;
generating a target rack corresponding to the decision surface by:
associating decision surface threshold exceedances to produce a relative-bearing track as a function of bearing and time;
calculating a true bearing track corresponding to each of the relative-bearing tracks by reconciling the relative-bearing tracks with an estimate of hydrophone sensor array orientation; and
transforming the acoustic signals from the frequency domain to the time domain using the relative-bearing track to generate the target track;
generating a summary report of spectral data associated with each target track; and
outputting a compressed data report identifying the characteristics of the generated target track included in the generated summary report.

2. The method of claim 1, wherein the plurality of hydrophone sensors include a multi-channel hydrophone sensor, a linear hydrophone sensor, a planar hydrophone sensor, a mobile hydrophone sensor, a fixed hydrophone sensor, or a passive hydrophone sensor.

3. The method of claim 2, wherein the plurality of hydrophone sensors are configured in an array.

4. The method of claim 1, wherein prior to transforming the received acoustic signals from the time domain to the frequency domain, the acoustic signals are conditioned for bias detection and removal, inoperative channel shading, transient suppression, sidelobe suppression, and/or sub-aperture phase alignment.

5. The method of claim 1, wherein generating a relative-bearing beam response for each of the transformed acoustic signals includes using linear or data adaptive methods to compute the spatial filter weighting coefficients of the beamformer required to generate each relative-bearing beam response.

6. The method of claim 1, wherein generating a relative-bearing beam response for each of the transformed signals in one or more beam steering directions includes generating a relative-bearing beam response in one or more beam steering directions spanning the azimuthal beamspace from forward endfire to aft endfire.

7. The method of claim 1, wherein the received acoustic signals are transformed from the frequency domain to the time domain using an inverse Fast Fourier Transform algorithm.

8. The method of claim 1, wherein generating a target track further includes generating a target track and scissor-gram for further classification.

9. A system for autonomous joint detection-classification, and tracking of targets of interest, the system comprising:
a hydrophone sensor array configured to receive and transmit a plurality of acoustic signals originating above or below the surface;
a marine vehicle platform including a memory module, a communications module, a global positioning system receiver and one or more embedded processors, the one or more embedded processors configured to autonomously:
receive acoustic signals from a plurality of hydrophone sensors, each of the respective acoustic signals characterized by time-series data;
detect a target of interest corresponding to each of the respective received acoustic signals by:
transforming the received acoustic signals from the time domain to the frequency domain;
generating a relative-bearing beam response for each of the transformed signals in one or more beam steering directions;
estimating the median background noise level of the relative-bearing beam response in each of the one or more beam steering directions and normalizing the spectral response of the relative-bearing beam response by the estimated background noise level, wherein a normalized spectral response is produced that is associated with each relative-bearing beam response;
performing a joint detection-classification operation, wherein the joint detection-classification operation comprises a selective frequency integration of the normalized spectral response associated with each relative-bearing beam response, wherein the frequency integration is constrained by the detailed physics of the underlying classifier for the target of interest to satisfy a spatial and spectral target hypothesis of the classifier;

computing a detection surface in bearing and time based on the frequency integration of the joint detection-classification operation; and determining a decision surface in bearing and time by calculating a constant-false-alarm-rate (CFAR) detection threshold from the estimated background noise level and applying the constant-false-alarm-rate detection threshold to the detection surface;

generate a target track corresponding to the decision surface by:

associating decision surface threshold exceedances to produce a relative-bearing track as a function of bearing and time;

calculating a true bearing track corresponding to each of the relative-bearing tracks by reconciling the relative bearing tracks with an estimate of hydrophone sensor array orientation; and transforming the received acoustic signals from the frequency domain to the time domain using the relative-bearing track;

generating a summary report of spectral data associated with each target track; and output a compressed data report identifying the characteristics of the generated target track included in the generated summary report.

10. The system of claim 9, wherein the hydrophone sensor array is external the marine vehicle platform.

11. The system of claim 9, wherein the hydrophone sensor array is towed by the marine vehicle platform.

12. The system of claim 9, wherein the hydrophone sensor array is mounted on the marine vehicle platform.

13. The system of claim 9, wherein the marine vehicle platform is propelled using an electric-motor driven propeller, a buoyancy-based propulsion system, or a propulsion system powered by wave energy.

14. The system of claim 9, wherein a separate surrogate marine vehicle platform is further configured to transmit target of interest-like signals from known locations allowing the quantification of parameters associated with each generated target track including one or more of detection probability, detection false alarm probability, classification probability, classification false alarm probability, system processing gain and bearing errors.

15. The system of claim 9, wherein the hydrophone sensor array includes one of a multi-channel hydrophone sensor, a linear hydrophone sensor, a planar hydrophone sensor, a mobile hydrophone sensor, a fixed hydrophone sensor, or a passive hydrophone sensor.

16. The system of claim 9, wherein prior to transforming the received acoustic signals from the time domain to the frequency domain, the acoustic signals are conditioned for bias detection and removal, inoperative channel shading, transient suppression, sidelobe suppression, and/or sub-aperture phase alignment.

17. The system of claim 9, wherein generating a relative-bearing beam response for each of the transformed acoustic signals includes using linear or data-adaptive methods to compute the spatial filter weighting coefficients of the beamformer required to generate each relative-bearing beam response.

18. The system of claim 9, wherein generating a relative-bearing beam response for each of the transformed signals in one or more beam steering directions includes generating a relative-bearing beam response in one or more beam steering directions spanning the azimuthal beamspace from forward endfire to aft endfire.

19. The system of claim 9, wherein a time-synchronized acoustic signal is transmitted from a separate surrogate marine vehicle platform and used to calibrate the one or more embedded processors to achieve increased joint detection-classification performance and decreased detection false alarm rates.

20. A system for implementing for autonomous joint detection-classification, and tracking of targets of interest, the system comprising:

a memory including processor-executable instructions;

a processor having access to the memory and configured, upon reading the processor-executable instructions, to:

receive acoustic signals from a plurality of acoustic sensors, each of the respective acoustic signals characterized by time-series data;

detect a target of interest corresponding to one or more of the respective received acoustic signals by:

transforming the received acoustic signals from the time domain to the frequency domain;

generating a relative-bearing beam response for each of the transformed signals in one or more beam steering directions;

estimating the median background noise level of the relative-bearing beam response in each of the one or more beam steering directions and normalizing the spectral response of the relative-bearing beam response by the estimated background noise level, wherein a normalized spectral response is produced that is associated with each relative-bearing beam response;

performing a joint detection-classification operation, wherein the joint detection-classification operation comprises selective frequency integration of the normalized spectral response associated with each relative-bearing beam response, wherein the frequency integration is constrained by an underlying classifier for the target of interest to satisfy a spatial and spectral target hypothesis of the classifier;

computing a detection surface in bearing and time based on the frequency integration of the joint detection-classification operation; and determining a decision surface in bearing and time by calculating a constant-false-alarm-rate (CFAR) detection threshold from the estimated background noise level and applying the constant-false-alarm-rate detection threshold to the detection surface; and generate a target track corresponding to the decision surface, indicating a track of the target of interest.

* * * * *